US010654982B2

(12) United States Patent
Lim et al.

(10) Patent No.: US 10,654,982 B2
(45) Date of Patent: May 19, 2020

(54) METHOD FOR PREPARING POLARIZER PROTECTING FILM

(71) Applicant: LG CHEM, LTD., Seoul (KR)

(72) Inventors: Yi Rang Lim, Daejeon (KR); Jun Wuk Park, Daejeon (KR); Kyoung Won Kim, Daejeon (KR); Sung In Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 175 days.

(21) Appl. No.: 15/789,530

(22) Filed: Oct. 20, 2017

(65) Prior Publication Data

US 2018/0112050 A1    Apr. 26, 2018

(30) Foreign Application Priority Data

Oct. 20, 2016  (KR) .................. 10-2016-0136732
Oct. 16, 2017  (KR) .................. 10-2017-0134205

(51) Int. Cl.
| *B29D 11/00* | (2006.01) |
| *C08J 7/04* | (2020.01) |
| *G02B 1/14* | (2015.01) |
| *C08J 5/18* | (2006.01) |
| *B29C 55/16* | (2006.01) |
| *B29K 33/00* | (2006.01) |
| *G02B 5/30* | (2006.01) |
| *G02F 1/13357* | (2006.01) |

(52) U.S. Cl.
CPC ........ *C08J 7/0427* (2020.01); *B29D 11/00644* (2013.01); *C08J 5/18* (2013.01); *G02B 1/14* (2015.01); *B29C 55/16* (2013.01); *B29K 2033/12* (2013.01); *C08J 2333/12* (2013.01); *C08J 2463/00* (2013.01); *G02B 5/3025* (2013.01); *G02F 1/13362* (2013.01); *G02F 2201/50* (2013.01)

(58) Field of Classification Search
CPC ....... B29D 11/00644; C08J 7/047; C08J 5/18; G02B 1/14; B29C 55/16
See application file for complete search history.

(56) References Cited

U.S. PATENT DOCUMENTS

| 9,599,753 | B2 | 3/2017 | Lee et al. | |
| 2009/0086318 | A1* | 4/2009 | Yaegashi | B32B 37/12 |
| | | | | 359/485.01 |
| 2010/0182548 | A1* | 7/2010 | Suzuki | C08J 5/18 |
| | | | | 349/96 |
| 2010/0296030 | A1 | 11/2010 | Shimizu et al. | |
| 2013/0244041 | A1 | 9/2013 | Cho et al. | |
| 2016/0185993 | A1* | 6/2016 | Yoshida | C09D 101/12 |
| 2016/0238767 | A1 | 8/2016 | Park et al. | |
| 2016/0272843 | A1 | 9/2016 | Suzuki et al. | |
| 2017/0210915 | A1 | 7/2017 | Lee et al. | |

FOREIGN PATENT DOCUMENTS

| CN | 101937113 | 1/2011 |
| CN | 102408839 | 4/2012 |
| JP | 688907 A | 3/1994 |
| JP | 2011-002813 A | 1/2011 |
| JP | 2011-028245 A | 2/2011 |
| JP | 2016012021 A | 1/2016 |
| JP | 2016071033 A | 5/2016 |
| JP | 101630938 B1 | 6/2016 |
| JP | 2016175991 A | 10/2016 |
| KR | 1020050063096 A | 6/2005 |
| KR | 1020120030925 A | 3/2012 |
| KR | 20130058951 A | 6/2013 |
| KR | 20140078824 A | 6/2014 |
| KR | 20150037489 A | 4/2015 |
| KR | 20160015181 A | 2/2016 |

OTHER PUBLICATIONS

Office Action of Chinese Patent Office in Appl'n No. 20170983282.5 dated Nov. 11, 2019.

* cited by examiner

*Primary Examiner* — Mathieu D Vargot
(74) *Attorney, Agent, or Firm* — Dentons US LLP

(57) ABSTRACT

The present invention relates to a method for preparing a polarizer protecting film. More specifically, the present invention relates to a method for preparing a polarizer protecting film capable of exhibiting excellent physical and optical properties and of preventing damages of a lower polarizer plate caused by a prism sheet.

6 Claims, 1 Drawing Sheet

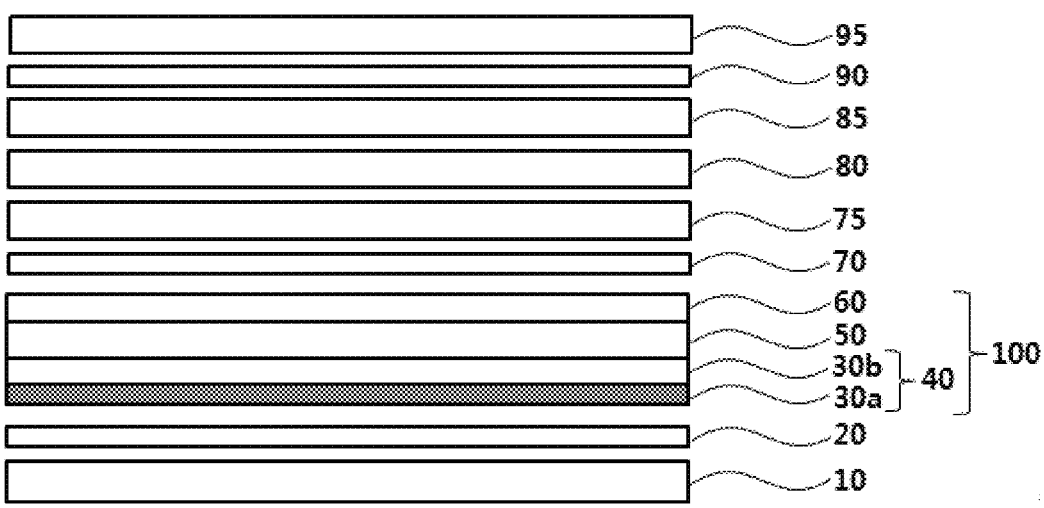

METHOD FOR PREPARING POLARIZER PROTECTING FILM

CROSS REFERENCE TO RELATED APPLICATIONS

This application claims the benefit of Korean Patent Application No. 10-2016-0136732 filed on Oct. 20, 2016 and Korean Patent Application No. 10-2017-0134205 filed on Oct. 16, 2017 with the Korean Intellectual Property Office, the disclosures of which are herein incorporated by reference in their entirety.

BACKGROUND OF THE INVENTION

(a) Field of the Invention

The present invention relates to a method for preparing a polarizer protecting film. More specifically, the present invention relates to a method for preparing a polarizer protecting film capable of exhibiting excellent physical and optical properties and of preventing damages of a lower polarizer plate.

(b) Description of the Related Art

A liquid crystal display (LCD) is currently one of the most widely used flat panel displays. In general, the liquid crystal display takes structure where a liquid crystal layer is enclosed between a TFT (Thin Film Transistor) array substrate and a color filter substrate. If an electric field is applied to electrodes present on the array substrate and the color filter substrate, the arrangement of liquid crystal molecules in the liquid crystal layer enclosed therebetween is changed, which allows image display.

In the liquid crystal display, as light emitted from a light source passes through a light guide plate and a diffusion sheet, its brightness is reduced. Therefore, a prism sheet is included for collecting the light again to increase the brightness. Such a prism sheet is usually provided under the lower polarizer plate. As displays become larger, a sagging phenomenon of the lower polarizer plate occurs, thereby causing damages such as grinding of the lower polarizer plate by the uneven structure of the prism sheet contacting the lower polarizer plate. To solve this problem, a method of coating a hard coating layer onto the protecting film of the lower polarizer plate has been proposed, but there is a problem of an increase in process costs.

In accordance with these needs, there is still a need to develop a method capable of preventing damages of the lower polarizer plate and an increase in haze due to a prism sheet while securing productivity to have price competitiveness in mass production.

SUMMARY OF THE INVENTION

In order to address the above problems, the present invention is devised to solve the problem of damaging the lower protecting film of the polarizer plate, and to provide a thin polarizer lower protection film having a scratch resistance. An object of the present invention is to provide a method for preparing a polarizer protecting film capable of exhibiting excellent physical and optical properties.

In order to achieve the above object, the present invention provides a method for preparing a polarizer protecting film, comprising the steps of:

coating a cationic curable coating composition onto at least one surface of a polymeric film;

stretching the polymeric film onto which the coating composition has been coated; and photo-curing the coating composition.

According to the method for preparing a polarizer protecting film of the present invention, it is possible to provide, with a high productivity, a thin polarizer protecting film having sufficient scratch resistance, and a polarizer plate including the same.

In addition, it is possible to exhibit excellent optical properties by preventing the problems that due to the unevenness of the prism sheet provided under the polarizer plate, the lower protecting film of the polarizer plate may be damaged to cause an increase in haze, and some of the damaged film may come out as a foreign substance to cause defects.

Further, since these effects are obtainable by applying the present invention to the lower polarizer plate of the LCD without changing the laminated structure of the LCD, no excessive process change or cost increase is required, thereby reducing production cost.

BRIEF DESCRIPTION OF THE DRAWINGS

FIG. 1 is a view showing a liquid crystal display according to an embodiment of the present invention.

DETAILED DESCRIPTION OF THE EMBODIMENTS

The method for preparing a polarizer protecting film of the present invention comprises the steps of: coating a cationic curable coating composition onto at least one surface of a polymeric film; stretching the polymeric film onto which the coating composition has been coated; and photo-curing the coating composition.

In the present invention, the term "upper surface" means a surface arranged to face a viewer when the polarizer plate is mounted on a device such as a liquid crystal display. The term "upper" means a direction directed toward a viewer when the polarizer plate is mounted on a device. Conversely, the term "lower surface" or "lower" means a surface or a direction arranged to face a side opposite to a viewer when the polarizer plate is mounted on a device.

Since a variety of modification may be made to the present invention and there may be various forms of the present invention, its specific examples are illustrated and will be described in detail below. However, it should be understood that this is not intended to limit the present invention to particular forms disclosed herein, and the invention encompasses all modifications, equivalents or alternatives falling within the spirit and technical scope of the present invention.

Hereinafter, the method for preparing a polarizer protecting film of the present invention will be described in more detail.

According to an embodiment of the present invention, there is provided a method for preparing a polarizer protecting film, comprising the steps of: coating a cationic curable coating composition onto at least one surface of a polymeric film; stretching the polymeric film onto which the coating composition has been coated; and photo-curing the coating composition.

A polarizer exhibits a property capable of extracting only light vibrating in one direction from the light made incident while vibrating in various directions. The polarizer protecting film of the present invention is used for protecting the polarizer from the outside and is used on at least one surface of the polarizer, preferably as a lower protecting film of the polarizer.

Meanwhile, as displays gradually increase in size, a sagging phenomenon the lower polarizer plate occurs, which causes the protecting film of the lower polarizer plate to be damaged by the prism sheet or the diffusion film provided under the lower polarizer plate, rid thereby haze may increase.

The present invention is intended to complement these problems, and an object thereof is to improve the polarizer plate, especially the lower polarizer plate, among the components included in the LCD, without changing the structure of the backlight, and include a stretched coating layer having scratch resistance on the polarizer protecting film of the lower polarizer plate, thereby preventing the problem of an increase in haze due to the prism sheet or the diffusion film.

Thus, the polarizer protecting film obtained by the preparation method of the present invention exhibits excellent physical properties such as scratch resistance and high hardness due to the stretched coating layer, thereby effectively protecting the lower polarizer plate and being usefully applicable to a polarizer plate for displays which are increasingly thinner and larger.

The polarizer protecting film prepared according to an embodiment of the present invention includes a stretched polymeric film; and a stretched coating layer formed on one surface of the stretched polymeric film.

The stretched polymeric film is not particularly limited as long as it is commonly usable as a base film of a polarizer protecting film and is a stretchable film. For example, polyester, polyethylene, cyclic olefin polymer (COP), cyclic olefin copolymer (COC), polyacrylate (PAC), polycarbonate (PC), polymethylmethacrylate (PMMA), or polyimide (PI) may be used.

The thickness of the stretched polymeric film is not particularly limited, and considering the subsequent stretching step, a base film having a thickness of about 50 to about 1,000 μm, or about 100 to about 500 μm may be used.

In addition, the method of forming the polymeric film is not particularly limited, and an unstretched polymeric film may be prepared by a suitable film forming method such as a solution casting method, a melt extrusion method, a calendering method, and a compression forming method.

Conventionally, as a polarizer protecting film, a triacetyl-cellulose (TAC) film has been widely used due to its excellent optical properties. However, since the TAC film has weak surface hardness and is vulnerable to humidity, a polyester-based film, a polyacrylate-based film, or the like has been recently used in place of the TAC film. In particular, films produced by a stretching process are widely used in order to develop an optical film having excellent mechanical properties.

Meanwhile, in the case of a stretched film, when the polymer is rearranged in the stretching step and a functional coating layer or the like is additionally formed on the stretched film, there is a problem that the adhesion is decreased. Therefore, a method of adding a separate step such as formation of a primer layer for securing the adhesion or a method of including, in a coating layer, a functional compound capable of promoting the adhesion has been proposed. In this case, there are problems that productivity is decreased since a separate step is added in the manufacturing process, and that it is difficult to develop general purpose primers since each film has different physical and chemical properties. In addition, adding a functional compound to a coating layer may cause a problem such as an increase of costs and deterioration of other properties.

Thus, the present invention has been made to solve these problems. According to an embodiment of the present invention, it is possible to provide a polarizer protecting film having high adhesion to a stretched film which is a base, having sufficient scratch resistance and being thinner, without a separate primer layer.

According to an embodiment of the present invention, it is possible to coat a coating composition onto one surface of the polymeric film in its unstretched state.

Alternatively, according to another embodiment of the present invention, the polymeric film may be uniaxially stretched before coating the coating composition thereon.

In this case, the stretching direction is not particularly limited, and the stretching may be performed such that the stretching ratio is 1.1 times or more, 1.2 times or more, or 1.5 times or more, and 5 times or less, or 3 times or less, based on the length in the stretching direction.

A cationic curable coating composition is coated onto at least one surface of the unstretched or uniaxially stretched polymeric film.

In general, in order to form a functional coating layer such as a hard coating layer on a polarizer protecting film, a method of coating a coating composition onto a stretched film, and drying and curing the same is used. However, in the case of a stretched film, since it has undergone polymer rearrangement during the stretching process, there is a problem that a coating layer is not adhered well to the stretched film. Although there is a method of forming a primer layer in order to secure adhesion, there are problems that productivity is decreased since a separate step is added in the manufacturing process, and that it is difficult to develop general purpose primers.

According to the preparation method of the present invention, by coating a coating composition onto a polymeric film, subjecting to stretching, and then curing the coating composition to form a coating layer, it is possible to provide a polarizer protecting film having high adhesion to a stretched polymeric film and being thinner, without requiring a separate primer layer.

Meanwhile, when the coating composition is too rigid, there is a problem that the coating layer becomes uneven during the stretching step after coating or the stretching is not performed properly. On the contrary, when the coating composition is flexible and has too high stretching rate, it may not be possible to secure sufficient strength and scratch resistance after coating and curing.

Therefore, in order to achieve a uniform stretching step and to exhibit sufficient scratch resistance after curing, it is important to appropriately balance the flexibility and strength of the coating composition along with controlling the stretching ratio of the polymeric film.

Thus, according to the preparation method of the present invention, it is possible to provide a polarizer protecting film satisfying the aforementioned requirements by optimizing the composition of the coating composition and the stretching step.

A radical curable binder such as an acrylate-based binder is mainly used for forming a coating layer of a polarizer protecting film. The radical curable resin is used for the purpose of forming a coating layer having high hardness due to its high degree of cure. However, since the radical-curable resin has short crosslinking distance, cure shrinkage phenomenon occurs, thereby deteriorating adhesion to the base film or likely causing a phenomenon in which curls or cracks are generated on the coating layer.

However, according to the present invention, a coating composition containing a cationic curable binder as a main component is used without a radical curable binder having a large cure shrinkage such as an acrylate-based binder and a stretching step is performed after coating the coating composition, and thereby it is possible to remarkably reduce the deterioration of adhesion to the base film due to cure shrinkage and the phenomenon in which the coating layer is curled and/or cracked. Therefore, it is possible to prepare a protecting film having high adhesion between the coating layer and the base film while satisfying flexibility and hardness at the same time.

The cationic curable coating composition coated onto the polymeric film includes a cationic curable binder containing an epoxy-based compound; and a cationic polymerization initiator.

According to an embodiment of the present invention, the weight average molecular weight of the epoxy-based compound is not particularly limited, and may be, for example, in the range of about 100 to about 5,000 g/mol, or about 200 to about 5,000 g/mol. If the weight average molecular weight is too large, coatability may become poor due to high viscosity. If the weight average molecular weight is too small, the hardness may be decreased. From this viewpoint, the weight average molecular weight of the cationic curable binder is preferably within the above range.

The epoxy-based compound is a binder which contains at least one epoxy group and is initiated to cure by cations generated from a cationic polymerization initiator upon irradiation with ultraviolet rays. Examples thereof may include an aromatic epoxy-based compound, a hydrogenated epoxy-based compound, an alicyclic epoxy-based compound, an aliphatic epoxy-based compound and the like, and an alicyclic epoxy-based compound may be preferably used.

The aromatic epoxy-based compound means an epoxy-based compound containing at least one aromatic hydrocarbon ring in its molecule, and may include, but not limited thereto, for example, a bisphenol type epoxy resin such as diglycidyl ether of bisphenol A, diglycidyl ether of bisphenol F, diglycidyl ether of bisphenol S; a novolac type epoxy resin such as phenol novolac epoxy resin, cresol novolac epoxy resin, hydroxybenzaldehyde phenol novolac epoxy resin; a multifunctional epoxy resin such as glycidyl ether of tetrahydroxyphenyl methane, glycidyl ether of tetrahydroxybenzophenone, epoxidized polyvinylphenol; and the like.

In addition, the hydrogenated epoxy-based compound means an epoxy-based compound obtained by selectively hydrogenating the aromatic epoxy-based compound under pressure in the presence of a catalyst. It is preferable to use diglycidyl ether of hydrogenated bisphenol A among others, but is not limited thereto.

Further, the alicyclic epoxy-based compound means an epoxy-based compound in which an epoxy group is formed between two adjacent carbon atoms constituting an aliphatic hydrocarbon ring, and may include, but not limited thereto, for example, 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinylcyclohexanedioxide, bis(3,4-epoxycyclohexylmethyl)adipate, bis(3,4-epoxy-6-methylcyclohexylmethyl)adipate, exo-exobis(2,3-epoxycyclopentyl)ether, endo-exobis(2,3-epoxy cyclopentyl)ether, 2,2-bis[4-(2,3-epoxypropoxy)cyclohexyl]propane, 2,6-bis(2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadienedioxide, 1,2-epoxy-6-(2,3-epoxypropoxy)hexahydro-4,7-methanoindane, p-2,3-epoxy)cyclopentylphenyl-2,3-epoxypropyl ether, 1-(2,3-epoxypropoxy)phenyl-5,6-epoxyhexahydro-4,7-methanoindane, o-(2,3-epoxy) cyclopentylphenyl-2,3-epoxypropyl ether), 1,2-bis[5-(1,2-epoxy)-4,7-hexahydromethanoindanoxyl] ethanocyclopentenylphenyl glycidyl ether, methylenebis(3,4-epoxycyclohexane)ethyleneglycoldi(3,4-epoxycyclohexylmethyl) ether, ethylenebis(3,4-epoxycyclohexanecarboxylate), ε-caprolactone (1 to 10 mol) adduct with 3,4-epoxycyclohexane methanol and esterified compounds of multivalent (value of 3 to 20) alcohols (GR, TMP, PE, DPE, hexapentaerythritol), and the like. From the viewpoint of reactivity, among others, it is particularly preferable to use 3,4-epoxycyclohexylmethyl-3,4-epoxycyclohexanecarboxylate.

According to an embodiment of the present invention, the cationic curable coating composition may further include an oxetane-based compound as a cationic curable binder.

The oxetane-based compound is a binder which contains at least one oxetane group and is initiated to cure by cations generated from a cationic polymerization initiator upon irradiation with ultraviolet rays. It may be used without particular limitation to its type.

The oxetane-based compound is capable of lowering the viscosity of the cationic curable composition and of further enhancing the curing rate.

More specifically, the oxetane-based compound may include, for example, 3-ethyl-3-[(3-ethyloxetan-3-yl) methoxymethyl]oxetane, 1,4-bis[(3-ethyloxetane-3-yl) methoxymethyl]benzene, 1,4-bis[(3-ethyloxetan-3-yl) methoxyl]benzene, 1,3-bis[(3-ethyloxetan-3-yl)methoxy] benzene, 1,2-bis[(3-ethyloxetan-3-yl)methoxy]benzene, 4,4'-bis[(3-ethyloxetan-3-yl)methoxy]biphenyl, 2,2'-bis[(3-ethyloxetan-3-yl)methoxy]biphenyl, 3,3',5,5'-tetramethyl-4,4'-bis[3-ethyloxetan-3-yl)methoxy]biphenyl, 2,7-bis[(3-ethyloxetan-3-yl)methoxy]naphthalene, bis{4-[(3-ethyloxetan-3-yl)methoxy]phenyl}methane, bis{2-[3-ethyloxetan-3-yl) methoxy]phenyl}methane, 2,2-bis{4-[(3-ethyloxetan-3-yl) methoxy]phenyl}propane, an etherified modification of novolac type phenol-formaldehyde resin with 3-chloromethyl-3-ethyloxetane, 3(4),8(9)-bis[(3-ethyloxetane-3-yl) methoxymethyl]-tricyclo[5.2.1.0 2,6]decane, 2,3-bis[(3-ethyloxetan-3-yl)methoxymethyl]norborane, 1,1,1-tris[(3-ethyloxetan-3-yl)methoxymethyl]propane, 1-butoxy-2,2-bis [(3-ethyloxetan-3-yl)methoxymethyl]butane, 1,2-bis{[2-(3-ethyloxetan-3-yl)methoxy]ethylthio}ethane, bis{[4-(3-ethyloxetan-3-yl)methylthio]phenyl}sulfide, 1,6-bis[(3-ethyloxetan-3-yl)methoxy]-2,2,3,3,4,4,5,5-octafluorohexane, and the like.

According to an embodiment of the present invention, a compound may be used, which is obtained by reaction of 3-ethyl-3-(hydroxymethyl)oxetane with one or more compounds selected from the group including m-tetramethyl-xylene diisocyanate azelaoyl chloride, terephthaloyl chloride and 1,3,5-benzene tricarbonyl trichloride.

When the oxetane-based compound is further included, the content thereof may be about 5 to about 80 parts by weight, preferably about 10 to about 60 parts by weight, based on 100 parts by weight of the epoxy-based compound. If the content of the oxetane-based compound is too high, the hardness of the coating layer after curing may be decreased. If the content of the oxetane-based compound is too low, the effect shown by addition of the oxetane-based compound is insignificant. From this viewpoint, the above range of parts per weight is preferable.

The cationic curable coating composition includes a cationic polymerization initiator.

The cationic polymerization initiator means a compound that produces a cationic species or Lewis acid by irradiation with active energy rays such as ultraviolet rays and acts on a cationic polymerizable group such as an epoxy group to initiate a cationic polymerization reaction.

In this case, as the cationic polymerization initiator, any cationic polymerization initiators commonly used in the art may be used without limitation. For example, as the cationic polymerization initiator, the one containing a sulfonium salt or an iodonium salt may preferably be used.

Specific examples of the cationic polymerization initiator containing a sulfonium salt or an iodonium salt may include, but not limited thereto, for example, one or more selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl) phenyl]-iodonium hexafluorophosphate, (thiodi-4,1-phenylene)bis(diphenylsulfonium) dihexafluoroantimonate and (thiodi-4,1-phenylene)bis(diphenylsulfonium) dihexafluorophosphate.

The content of the cationic polymerization initiator may be about 0.1 to about 10 parts by weight, preferably about 0.1 to about 5 parts by weight, based on 100 parts by weight of the total cationic curable binder.

According to an embodiment of the present invention, the coating composition may further include a heat-curable binder, and a thermal polymerization initiator. When the coating composition includes a heat-curable binder, a thermal curing process may be added during curing of the coating composition.

The cationic curable coating composition of the present invention has low viscosity and good coating property, thereby allowing it to be used in a solvent-free type without any solvent. However, it does not exclude the use of an organic solvent, and if necessary, an organic solvent commonly used in the art may be used in such a way that it is contained in a small amount, for example, about 20 parts by weight or less based on 100 parts by weight of the total coating composition.

Examples of a usable organic solvent may include an alcohol-based solvent such as methanol, ethanol, isopropyl alcohol and butanol, an alkoxy alcohol-based solvent such as 2-methoxyethanol, 2-ethoxyethanol and 1-methoxy-2-propanol, a ketone-based solvent such as acetone, methyl ethyl ketone, methyl isobutyl ketone, methyl propyl ketone and cyclohexanone, an ether-based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether and diethylene glycol-2-ethylhexyl ether, an aromatic solvent such as benzene, toluene and xylene, and the like, and these solvents may be used alone or in a mixture thereof.

Meanwhile, according to an embodiment of the present invention, the coating composition may further include organic fine particles or inorganic fine particles to enhance the hardness of the stretched coating layer. The organic or inorganic fine particles may be particles having a particle diameter of 10 μm or less, more specifically, about 10 nm to about 10 μm, preferably about 50 nm to about 5 μm, more preferably about 100 nm to about 3 μm, in terms of making haze and coating thickness proper.

Any organic or inorganic fine particles may be used without limitation to their constitution as long as they are a type used for forming a coating layer of an optical film.

For example, as the organic fine particles, one or more selected from organic fine particles consisting of an acryl-based resin, a styrene-based resin, an epoxy resin, and a nylon resin, may be used.

More specifically, the organic fine particles may be one or more selected from the group consisting of methyl(meth)acrylate, ethyl(meth)acrylate, propyl(meth)acrylate, n-butyl(meth)acrylate, isobutyl(meth)acrylate, t-butyl(meth)acrylate, 2-ethylhexyl(meth)acrylate, n-octyl(meth)acrylate, lauryl(meth)acrylate, stearyl(meth)acrylate, 2-hydroxyethyl(meth)acrylate, polyethylene glycol(meth)acrylate, methoxypolyethylene glycol(meth)acrylate, glycidyl(meth)acrylate, dimethylaminoethyl(meth)acrylate, diethylaminoethyl(meth)acrylate, styrene, p-methylstyrene, m-methylstyrene, p-ethylstyrene, m-ethylstyrene, p-chlorostyrene, m-chlorostyrene, p-chloromethylstyrene, m-chloromethylstyrene, styrenesulfonic acid, p-t-butoxystyrene, m-t-butoxystyrene, vinyl acetate, vinyl propionate, vinyl butyrate, vinyl ether, allyl butyl ether, allyl glycidyl ether, (meth)acrylic acid, maleic acid, unsaturated carboxylic acid, alkyl (meth)acrylamide, (meth)acrylonitrile and (meth)acrylate, but the present invention is not limited thereto.

In addition, as the organic fine particles, one or more, or copolymers of two or more thereof, selected from polystyrene, polymethyl methacrylate, polymethyl acrylate, polyacrylate, polyacrylate-co-styrene, polymethyl acrylate-co-styrene, polymethyl methacrylate-co-styrene, polycarbonate, polyvinyl chloride, polybutylene terephthalate, polyethylene terephthalate, polyamides, polyimides, polysulfone, polyphenylene oxide, polyacetal, epoxy resin, phenol resin, silicone resin, melamine resin, benzoguanamine, polydivinylbenzene, polydivinylbenzene-co-styrene, polydivinylbenzene-co-acrylate, polydiallyl phthalate and triallyl isocyanurate polymer, may be used, but the present invention is not limited thereto.

Further, as the inorganic fine particles, one or more selected from the group of inorganic fine particles consisting of silicon oxide, titanium dioxide, indium oxide, tin oxide, zirconium oxide and aluminum oxide, but the present invention is not limited thereto.

The total content of the organic and inorganic fine particles may be in the range of about 0.1 to about 20 parts by weight, preferably about 1 to about 10 parts by weight, based on 100 parts by weight of the cationic curable coating composition. If the total content of the organic and inorganic fine particles is less than 0.1 part by weight based on 100 parts by weight of the cationic curable composition, the effect of enhancing hardness and scratch resistance is insignificant. If the total content of the organic and inorganic fine particles is more than 20 parts by weight, the viscosity of the coating composition becomes high and thus causes poor coatability, and the haze value becomes too high due to the internal scattering and thus lowers the contrast ratio.

Meanwhile, in addition to the aforementioned components, the coating composition of the present invention may further include an additive commonly used in the art to which the present invention belongs, such as a surfactant, an antioxidant, a UV stabilizer, a leveling agent, an antifouling agent, an antistatic agent, a UV absorber, a deforming agent and a preservative. In addition, the content thereof may be variously adjusted within a range that does not deteriorate the properties of the coating composition of the present invention. Thus, there is no particular limitation thereto. For example, it may be included in an amount of about 0.1 to about 10 parts by weight based on 100 parts by weight of the total coating composition.

The method of coating the coating composition is not particularly limited as long as it may be used in the art to which the present technology belongs. A bar coating method, a knife coating method, a roll coating method, a blade coating method, a die coating method, a microgravure coating method, a comma coating method, a slot die coating method, a lip coating method, or a solution casting method, or the like may be used.

Next, the polymeric film onto which the coating composition has been coated is stretched.

The stretching direction is not particularly limited, and the stretching may be performed such that the stretching ratio is 1.05 times or more, 1.2 times or more, or 1.5 times or more, and 5 times or less, or 3 times or less, based on the length in the stretching direction. If the stretching ratio is less than 1.05 times, the effect of stretching may not be sufficiently achieved. If the stretching ratio is more than 10 times, the coating layer may be cracked. From this viewpoint, it is preferable to perform the stretching within the aforementioned stretching ratio.

If the polymeric film is in a uniaxially stretched state before application of the coating composition, it is preferable to perform the stretching such that the stretching direction after the coating is perpendicular to the stretching direction before application of the coating composition. For example, if the polymeric film is stretched in the length (MD) direction before application of the coating composition, it may be stretched in the width (TD) direction after application of the coating composition.

In addition, if the polymeric film is stretched, respectively, before and after coating the coating composition, the stretching may be performed such that the total stretching ratio is 1.1 times or more, or 1.2 times or more, or 1.5 times or more, and 25 times or less, or 10 times or less, or 7 times or less, based on the total stretching area of the polymeric film. If the stretching ratio is less than 1.1 times, the effect of stretching may not be sufficiently achieved. If the stretching ratio is more than 25 times, the coating layer may be cracked. From this viewpoint, it is preferable to perform the stretching within the aforementioned stretching ratio.

Before the stretching, a drying step may be further performed in order to planarize the coated surface of the coating composition, and to volatilize the solvent contained in the coating composition.

Next, a photo-curing reaction may be performed by irradiating the coating composition with ultraviolet rays, thereby forming a stretched coating layer. The dose of the ultraviolet rays may be, for example, about 20 to about 800 mJ/cm$^2$. The light source for ultraviolet irradiation is not particularly limited as long as it may be used in the art to which the present technology belongs. For example, a high-pressure mercury lamp, a metal halide lamp, a black light fluorescent lamp, or the like may be used.

The polarizer protecting film of the present invention obtained by the process as described above includes a stretched polymeric film and a stretched coating layer formed on at least one surface of the polymeric stretched film.

Since the stretched coating layer has been stretched with being integrated with the stretched polymeric film, it is advantageous to provide a thin polarizer protecting film having high adhesiveness with the polymeric film, which is a base, even without a separate primer layer.

According to an embodiment of the present invention, the stretched coating layer has a final thickness, after drying, stretching and curing, of about 100 nm or more, for example, about 100 nm or more, or about 500 nm or more, or about 1 μm or more, and also about 20 μm or less, or about 10 μm or less, or about 5 μm or less, or about 3 μm or less. As such, the stretched coating layer of the present invention may be made thin and exhibit sufficient strength. Further, it may exhibit sufficient hardness and scratch resistance even with a single coating layer while exhibiting high adhesion to a base even without a primer layer, thereby achieving high workability and productivity in the manufacturing process.

The stretched coating layer may be formed on only one surface of the stretched polymeric film or may be formed on both surfaces of the stretched polymeric film.

When the stretched coating layer is formed on only one surface of the stretched polymeric film, the other surface may further include one or more of another photo-curable coating layer and/or heat-curable coating layer, or other layer, membrane, or film, or the like for imparting functionality. It is also possible to additionally form another functional layer on the stretched coating layer.

As such, when the polarizer protecting film of the present invention includes another layer, membrane, or film, or the like on the other surface of the stretched polymeric film, the method and step of forming the same are not limited. For example, another layer, membrane, or film may be laminated on the other surface of the stretched polymeric film by various methods known in the art, such as a method of coating before the stretching of the polymeric film and curing the coating after the stretching of the polymeric film, a method of coating and curing after the stretching of the polymeric film, and a method of laminating a separately sorted layer, membrane, or film on the stretched polymeric film using an adhesive, or the like.

The polarizer protecting film obtained by the preparation method of the present invention as described above may exhibit scratch resistance to such an extent that change in haze is 0.5 or less, as measured by mounting #0000 steel wool on a friction tester and then measuring the change haze before and after reciprocating it 10 times under a load of 100 g.

Further, the polarizer protecting film obtained by the preparation method of the present invention may have a pencil hardness of H or higher under a load of 500 g.

A polarizer protecting film obtained by the aforementioned preparation method may be laminated on at least one surface of a polarizer to provide a polarizer plate including the polarizer protecting film.

A polarizer exhibits a property capable of extracting only light vibrating in one direction from the light made incident while vibrating in various directions. This property may be achieved by stretching iodine-adsorbed PVA (polyvinyl alcohol) with a strong tensile force. For example, more specifically, a polarizer may be formed through a step of swelling a PVA film by immersing it in an aqueous solution, a step of dyeing the swollen PVA film with a dichroic material imparting polarizing properties, a step of stretching the dyed PVA film so that the dichroic dye material is arranged in parallel with each other in the stretched direction, and a step of correcting the color of the PVA film which has undergone the stretching step. However, the polarizer plate of the present invention is not limited thereto.

According to an embodiment of the present invention, the polarizer protecting film may be adhered to both surfaces of the polarizer.

According to another embodiment of the present invention, the polarizer protecting film may be provided on only one surface of the polarizer, and a general purpose protecting film commonly used for protecting a polarizer may be provided on the other surface of the polarizer.

In this case, the polarizer plate may be used as a lower polarizer plate of the LCD, and the polarizer protecting film of the present invention may be configured to be positioned at the lower portion in the laminated structure within the LCD.

As described above, when the polarizer plate is laminated on the LCD in such a way that the polarizer protecting film is at the lower portion, it is possible to prevent the problem that due to the unevenness of the prism sheet or the diffusion film provided under the polarizer plate, the lower protecting film of the polarizer plate is damaged to cause an increase in haze, thereby exhibiting excellent optical properties.

The polarizer and the polarizer protecting film may be adhered to each other by lamination using an adhesive or the like. A usable adhesive is not particularly limited as long as it is known in the art. For example, there is a water-based adhesive, a one-component type or two-component type polyvinyl alcohol (PVA)-based adhesive, a polyurethane-based adhesive, an epoxy-based adhesive, a styrene butadiene rubber-based (SBR-based) adhesive, or a hot melt type adhesive, or the like. The present invention is not limited thereto.

When the polarizer protecting film of the present invention is laminated on and adhered to a polarizer, it is preferable to laminate the film in such a way that the surface thereof on which the stretched coating layer is not formed is adhered to the polarizer, and the stretched coating layer is positioned toward the outside of the polarizer plate.

Although the polarizer plate having the protecting film of the present invention is described, for example, for the case where it is applied to the LCD, it is not limited thereto and may be utilized in various fields. For example, the present protecting film may be used for applications such as mobile communication terminals, smart phones, other mobile devices, display devices, electronic blackboards, outdoor electronic signboards, and various displays. According to an embodiment of the present invention, the polarizer plate may be a TN (Twisted Nematic) or STN (Super Twisted Nematic) liquid crystal polarizer plate, and may be a polarizer plate for horizontal orientation mode such as IPS (In-Plane Switching), Super-IPS and FFS (Fringe Field Switching), and a polarizer plate for vertical orientation triode.

FIG. 1 is a view showing a liquid crystal display including the polarizer protecting film obtained by the preparation method of the present invention.

Referring to FIG. 1, a liquid crystal display device 1 includes a backlight unit 10; a prism sheet 20 provided on the backlight unit 10; and a polarizer plate 100 which is provided on the prism sheet 20 and is laminated such that a polarizer protecting film 40 faces the prism sheet 20.

The backlight unit 10 includes a light source that emits light from the rear surface of the liquid crystal panel. The type of the light source is not particularly limited, and a common light source for the LCD such as CCFL, HCFL, or LED may be used.

The prism sheet 20 is provided on the backlight unit 10. The prism sheet 20 is provided to increase the brightness of light again since the light emitted from the backlight unit 10 shows decreased brightness as it passes through a light guide plate and a diffusion sheet (not shown in the drawings). The prism sheet 20 is provided under the lower polarizer plate. However, since the prism sheet 20 includes an uneven structure, there is a problem that the lower protecting film of the lower polarizer plate, which comes in contact with the prism sheet 20, is damaged to cause an increase in haze.

However, the liquid crystal display as described above is capable of improving this problem by laminating the polarizer plate 100 such that a stretched coating layer 30a of the polarizer protecting film 40 faces the prism sheet 20.

In other words, referring to FIG. 1, the polarizer plate 100 is provided on the prism sheet 20, and the polarizer plate 100 includes a polarizer 50 with a general purpose protecting film 60 provided on one surface and with the polarizer protecting film 40 of the present invention adhered on the other surface, wherein the polarizer protecting film 40 includes a base 30b and a stretched coating layer 30a. In this case, the polarizer plate 100 has a structure in which the polarizer protecting film 40 of the present invention is laminated to face the lower portion of the LCD, that is, the prism sheet 20. Due to such a laminated structure, it is possible to prevent the problem that the polarizer plate 100 is damaged by the unevenness of the prism sheet 20 to cause increased haze, thereby exhibiting excellent optical properties.

In addition, according to an embodiment of the present invention, a diffusion film or a DBEF (Dual Brightness Enhancement Film) (not shown in the drawings) may be further included between the prism sheet 20 and the polarizer plate 100, or between the backlight unit 10 and the prism sheet 20. When the diffusion film or the DBEF film is positioned between the prism sheet 20 and the polarizer plate 100, the polarizer protecting film 40 of the polarizer plate 100 comes into contact with the diffusion film or the DBEF film. Even in this case, it is possible to equally prevent the problem that the lower polarizer plate is damaged by the diffusion film or the DBEF film, or the like, and thus haze is increased.

Layers provided on the upper portion of the polarizer plate 100 follow the structure of a common liquid crystal display. FIG. 1 shows that a lower glass substrate 70, a thin film transistor 75, a liquid crystal layer 80, a color filter 85, an upper glass substrate 90 and an upper polarizer plate 95 are laminated in this order. However, the LCD of the present invention is not limited thereto, and may include all structures in which if necessary, some of the layers shown in FIG. 1. may be changed or excluded, or another layer, substrate, film, sheet, or the like is added.

Hereinafter, actions and effects of the present invention will be described in more detail through specific examples, However, these examples are given to merely illustrate the invention and are not intended to limit the scope of the invention thereto.

EXAMPLES

Preparation of Coating Composition

Preparative Example 1

6 g of an alicyclic epoxy-based compound Celloxide 2021P (Mw: 252.3 g/mol, Daicel Corp.) as a cationic curable binder, 3 g of an oxetane-based compound OXT-221 (Toyagosei Co., Ltd.), and 0.3 g of CPI-100P (San-apro Ltd.) as a cationic polymerization initiator were mixed to prepare a coating composition.

Preparative Example 2

9 g of an alicyclic epoxy-based compound Celloxide 2021P as a cationic curable binder and 0.3 g of CPI-100P as a cationic polymerization initiator were mixed to prepare a coating composition.

Preparative Example 3

6 g of an alicyclic epoxy-based compound Celloxide 2081 (Mw: 366.5 g/mol, Daicel Corp.) as a cationic curable binder, 3 g of an oxetane-based compound OXT-221, and 0.3 g of CPI-100P as a cationic polymerization initiator were mixed to prepare a coating composition.

Preparative Example 4

6 g of an alicyclic epoxy-based compound EHPE 3150 (Mw: 4,000 g/mol, Daicel Corp.) as a cationic curable binder, 3 g of an oxetane-based compound OXT-221, and 0.3 g of CPI-100P as a cationic polymerization initiator were mixed to prepare a coating composition.

Preparative Example 5

8 g of an alicyclic epoxy-based compound Celloxide 2021P as a cationic curable binder, 1 g of an oxetane-based compound Eternacoil OXBP (Ube Co., Ltd.), and 0.3 g of CPI-100P as a cationic polymerization initiator were mixed to prepare a coating composition.

Preparative Example 6

0.3 g of PMMA bead MX-800T (Soken Co., Ltd.) as organic fine particles was further mixed with the coating composition of Preparative Example 1 to prepare a coating composition.

Preparative Example 7

0.6 g of silica (dispersed at 40 wt % in epoxy, average particle diameter of 10 to 20 nm, Ranco Co., Ltd.) as inorganic fine particles was further mixed with the coating composition of Preparative Example 2 to prepare a coating composition.

Preparative Example 8

0.6 g of alumina (dispersed at 30 wt % in epoxy, average particle diameter of 10 to 20 nm, Ranco Co., Ltd.) as inorganic fine particles was further mixed with the coating composition of Preparative Example 2 to prepare a coating composition.

Preparative Example 9

53 g of A-645GH from Takamatsu Oil & Fat as a water-dispersible polyester/acryl complex resin (solid contents: 30 wt %), 0.4 g of silica (dispersed at 30 wt % in water, average particle diameter of 70 to 100 nm, Ranco Co., Ltd) as inorganic fine particles and 4.3 g of water were mixed to prepare a coating composition.

Preparative Example 10

3.7 g of A-645GH from Takamatsu Oil & Fat as a water-dispersible polyester/acryl complex resin (solid contents: 30 wt %), 1.6 g of CK-PUD-PF from Chokwang Paint Co., Ltd. as a water-dispersible polyurethane resin (solid contents: 30 wt %), 0.4 g of silica (dispersed at 30 wt % in water, average particle diameter of 70 to 100 nm, Ranco Co., Ltd.) as inorganic fine particles and 4.3 g of water were mixed to prepare a coating composition.

Preparative Examples of Polarizer Protecting Film

Example 1

A polymethyl methacrylate resin was subjected to a T-die film-forming apparatus under the condition of 250° C. to prepare an unstretched film having a width of 800 mm and a thickness of 200 μm. A The unstretched film was stretched 1.8 times in the length (MD) direction at a temperature of 135° C. to prepare a uniaxially stretched film. The coating composition of Preparation Example 1 was coated on the uniaxially stretched film by a bar coating method and then stretched 2.5 times in the width (TD) direction at a temperature of 135° C.

The coating composition was irradiated with ultraviolet rays to prepare a polarizer protecting film having formed thereon a stretched coating layer with a thickness of 2 μm.

Examples 2 to 8

Polarizer protecting films were prepared in the same manner as in Example 1, except that the coating compositions of Preparative Examples 2 to 8 were used, respectively, in place of the coating composition of Preparative Example 1.

Comparative Example 1

A polymethyl methacrylate resin was applied to a T-die film-forming apparatus under the condition of 250° C. to prepare an unstretched film having a width of 800 mm and a thickness of 200 μm. The unstretched film was stretched 1.8 times in the length (MD) direction at a temperature of 135° C. and then was stretched 2.5 times in the width (TD) direction at a temperature of 135° C. to prepare a stretched film. The coating composition of Preparation Example 1 was coated at a thickness of 2 μm on the stretched film by a bar coating method and then was irradiated with ultraviolet rays to prepare a polarizer protecting film having a coating layer formed thereon.

Comparative Example 2

Except that a coating layer was not formed on a stretched film, the stretched film was prepared in the same manner as in Comparative Example 1 and used as it was as a polarizer protecting film.

Comparative Example 3

A polymethyl methacrylate resin was applied to a T-die film-forming apparatus under the condition of 250° C. to prepare an unstretched film having a width of 800 mm and a thickness of 200 μm. The unstretched film was stretched 1.8 times in the length (MD) direction at a temperature of 135° C. to prepare a uniaxially stretched film.

The coating composition of Preparative Example 9 was coated on the uniaxially stretched film by a bar coating method and then dried at temperature of 100° C.

The uniaxially stretched film was stretched 2.5 times in the width (TD) direction at a temperature of 135° C. In such a way, a polarizer protecting film having formed thereon a stretched coating layer with a thickness of 2 μm.

Comparative Example 4

A plarizer protecting film was prepared in the same manner as in Comparative Example 3, except that the coating composition of Preparative Example 10 was used.

Experimental Example

[Measurement Method]

The physical properties of the polarizer protecting films of Examples and Comparative Examples were measured by the following methods.

1) Scratch Resistance

The initial haze values were measured for the surfaces of the polarizer protecting films of the Examples and the Comparative Examples, and then the change in haze was measured after rubbing it 10 times in a reciprocating way against #0000 Steel wool under a load of 100 g. When the change in haze values compared to the initial haze values is 0.5 or less, it is expressed as ○; when the change in haze values is more than 0.5 and not more than 1, it is expressed as Δ; and when the change in haze values is more than 1, it is expressed as ×. The haze value was measured using a Haze meter (HM 150).

2) Adhesion

According to ASTM D3359, 100 (10×10) cuts were made on the respective coating layers of the polarizer protecting films of the Examples and Comparative Examples so that each cut has 1 mm in width and length, respectively. A tape (trade name: CT-24, manufacturer: Nichiban) was attached thereon, and then peeled off therefrom while counting the number of squares in the coating layer removed together with the tape.

When the number of removed squares was 0 to 5, it was evaluated as ○, and when the number of removed squares was 6 or more, it was evaluated as ×.

3) Pencil Hardness

Pencil hardness was measured using a pencil hardness meter (hardness tester, manufacturer: Chunghuk Tech) under a load of 500 g. According to ASTM 3363-74, the surface of the stretched coating layer was scratched by moving a standard pencil (Mitsubishi) with being kept at 45 degrees while changing it from 6B to 9H, and the change in surface was observed. Each experimental value was described as an average value after 5 measurements.

The measuretnent results for the above properties are shown in Table 1 below.

TABLE 1

|  | Scratch resistance | Pencil hardness | Adhesiveness |
|---|---|---|---|
| Example 1 | ○ | 2H | ○ |
| Example 2 | ○ | 3H | ○ |
| Example 3 | ○ | 2H | ○ |
| Example 4 | ○ | H | ○ |
| Example 5 | ○ | 2H | ○ |
| Example 6 | ○ | 2H | ○ |
| Example 7 | ○ | 2H | ○ |
| Example 8 | ○ | 3H | ○ |
| Comparative Example 1 | ○ | H | X |
| Comparative Example 2 | X | HB | Not Available |

TABLE 1-continued

|  | Scratch resistance | Pencil hardness | Adhesiveness |
|---|---|---|---|
| Comparative Example 3 | X | B | ○ |
| Comparative Example 4 | X | 2B | ○ |

Referring to Table 1, the polarizer protecting film obtained according to the preparation method of the present invention showed excellent haze, scratch resistance, pencil hardness, and adhesion. However, Comparative Example 1, in which a coating layer was formed on the stretched film without printer treatment, appeared to show poor adhesion.

It was evaluated that the Comparative Example 3 using a water-dispersible polyester/acryl complex resin as a stretched coating layer, and the Comparative Example 4 using a water-dispersible polyester/acryl complex resin and a water-dispersible polyurethane resin as a stretched coating layer, were not suitable as a lower protecting film of the polarizer plate because of its insufficient scratch resistance and pencil hardness.

What is claimed is:

1. A method for preparing a polarizer protecting film, comprising the steps of:
   stretching an unstretched polymeric film in a first direction that is a length direction or a width direction to prepare a uniaxially stretched polymeric film;
   coating a cationic curable coating composition comprising an alicyclic epoxy-based compound and a cationic polymerization initiator onto at least one surface of the uniaxially stretched polymeric film, wherein the weight average molecular weight of the alicyclic epoxy-based compound is 100 to 5,000 g/mol;
   stretching the uniaxially stretched polymeric film onto which the coating composition has been coated in a direction perpendicular to the first direction to form a biaxially stretched polymeric film; and
   photo-curing the coating composition to yield a polarizer protecting film having formed thereon a stretched coating layer having a pencil hardness of H or higher.

2. The method according to claim 1, wherein the stretching ratio in the step of stretching the polymeric film is 1.05 to 10 times, based on the length in the stretching direction.

3. The method according to claim 1, wherein the polymeric film includes one or more selected from the group consisting of polyester, polyethylene, cyclic olefin polymer (COP), cyclic olefin copolymer (COC), polyacrylate (PAC), polycarbonate (PC), polymethylmethacrylate (PMMA) and polyimide (PI).

4. The method according to claim 1, wherein the cationic curable coating composition further comprises organic fine particles or inorganic fine particles.

5. The method according to claim 1, wherein the cationic curable binder further contains an oxetane-based compound.

6. The method according to claim 1, wherein the alicyclic epoxy-based compound is selected from the group consisting of 2-(3,4-epoxy)cyclohexyl-5,5-spiro-(3,4-epoxy)-cyclohexane-m-dioxane, 3,4-epoxycyclohexylmethyl-3,4-epoxycyclohexane-carboxylate, 3,4-epoxy-6-methylcyclohexylmethyl-3,4-epoxy-6-methylcyclohexane-carboxylate, vinylcyclohexanedioxide, bis(3,4-epoxycyclohexyl-methyl)adipate, bis(3,4-epoxy-6-methylcyclohexylmethyl)-adipate, exo-exobis(2,3-epoxycyclopentyl)ether, endo-exobis(2,3-epoxycyclopentyl)ether, 2,2-bis[4-(2,3-epoxypropoxy)cyclohexyl]propane, 2,6-bis(2,3-epoxypropoxy-cyclohexyl-p-dioxane), 2,6-bis(2,3-epoxypropoxy)-norbornene, limonene dioxide, 2,2-bis(3,4-epoxycyclohexyl)propane, dicyclopentadienedioxide, 1,2-epoxy-6-(2,3-epoxypropoxy)hexahydro-4,7-methanoindane, p-2,3-epoxy)-cyclopentyl-phenyl-2,3-epoxypropyl ether, 1-(2,3-epoxypropoxy)phenyl-5,6-epoxyhexahydro-4,7-methanoindane, o-(2,3-epoxy)cyclopentylphenyl-2,3-epoxypropyl ether), 1,2-bis[5-(1,2-epoxy)-4,7-hexahydromethanoindanoxyl]-ethanocyclopentenylphenyl glycidyl ether, methylenebis(3,4-epoxycyclo-hexane)ethyleneglycoldi(3,4-epoxycyclohexyl-methyl) ether, ethylenebis(3,4-epoxycyclohexanecarboxylate), an ε-caprolactone (1 to 10 mol) adduct with 3,4-epoxycyclohexane methanol, Celloxide 2081 (3,4-epoxycyclohexyl-methyl-3',4'-epoxycyclohexanecarboxylate modified epsilon-caprolactone), and EHPE 3150 (condensation product of 1,2-epoxy-4-(2-oxiranyl)-cyclohexane of 2,2-bis(hydroxy methyl)-1-butanol).

* * * * *